(12) United States Patent
Guibert De Bruet et al.

(10) Patent No.: US 10,773,717 B2
(45) Date of Patent: Sep. 15, 2020

(54) VEHICLE ASSIST SYSTEM

(71) Applicant: TRW AUTOMOTIVE U.S. LLC, Livonia, MI (US)

(72) Inventors: Nicolas Guibert De Bruet, Birmingham, MI (US); Patrick A. Smith, Howell, MI (US)

(73) Assignee: TRW AUTOMOTIVE U.S. LLC, Livonia, MI (US)

( * ) Notice: Subject to any disclaimer, the term of this patent is extended or adjusted under 35 U.S.C. 154(b) by 224 days.

(21) Appl. No.: 15/951,286

(22) Filed: Apr. 12, 2018

(65) Prior Publication Data

US 2019/0315344 A1    Oct. 17, 2019

(51) Int. Cl.

| | |
|---|---|
| *B60W 30/09* | (2012.01) |
| *G05D 1/02* | (2020.01) |
| *B60W 10/18* | (2012.01) |
| *B60W 10/20* | (2006.01) |
| *B60W 30/14* | (2006.01) |
| *B60W 30/16* | (2020.01) |
| *B60W 30/12* | (2020.01) |
| *B60W 30/18* | (2012.01) |
| *G08G 1/16* | (2006.01) |
| *H04N 5/247* | (2006.01) |
| *G06K 9/00* | (2006.01) |
| *G05D 1/00* | (2006.01) |

(52) U.S. Cl.
CPC .......... *B60W 30/09* (2013.01); *B60W 10/18* (2013.01); *B60W 10/20* (2013.01); *B60W 30/12* (2013.01); *B60W 30/143* (2013.01); *B60W 30/16* (2013.01); *B60W 30/18036* (2013.01); *G05D 1/0088* (2013.01); *G05D 1/0246* (2013.01); *G06K 9/00798* (2013.01); *G06K 9/00805* (2013.01); *G08G 1/166* (2013.01); *G08G 1/167* (2013.01); *H04N 5/247* (2013.01); *B60W 2420/403* (2013.01); *B60W 2420/42* (2013.01); *B60W 2510/20* (2013.01); *B60W 2554/00* (2020.02); *B60W 2555/20* (2020.02); *B60W 2556/00* (2020.02); *B60W 2710/18* (2013.01); *B60W 2710/20* (2013.01); *B60W 2720/10* (2013.01); *G05D 2201/0213* (2013.01)

(58) Field of Classification Search
CPC ...................................................... B60W 30/09
USPC .............................................................. 701/28
See application file for complete search history.

(56) References Cited

U.S. PATENT DOCUMENTS

| | | | |
|---|---|---|---|
| 9,912,853 B2 * | 3/2018 | Zou .................. | H04N 5/232 |
| 2003/0093805 A1 * | 5/2003 | Gin .................. | G08B 13/19619 |
| | | | 725/105 |
| 2008/0192984 A1 * | 8/2008 | Higuchi .................. | G08G 1/16 |
| | | | 382/104 |

(Continued)

*Primary Examiner* — Jason C Olson
(74) *Attorney, Agent, or Firm* — Tarolli, Sundheim Covell & Tummino LLP

(57) ABSTRACT

A method for assisting the operation of a host vehicle traveling on a roadway includes acquiring images around the host vehicle with at least one primary camera assembly having a first field of view. Visibility is detected within the first field of view. The at least one primary camera assembly is deactivated when the detected visibility is below a predetermined value. Images are acquired around the host vehicle with at least one secondary camera assembly having a second field of view until the detected visibility in the first field of view is at or above the predetermined value.

20 Claims, 6 Drawing Sheets

(56) References Cited

U.S. PATENT DOCUMENTS

| | | | |
|---|---|---|---|
| 2012/0274776 A1* | 11/2012 | Gupta | H04N 7/181 |
| | | | 348/159 |
| 2013/0103257 A1* | 4/2013 | Almedia | B60Q 1/143 |
| | | | 701/36 |
| 2014/0049648 A1* | 2/2014 | Stein | B60Q 1/0023 |
| | | | 348/148 |
| 2014/0098229 A1* | 4/2014 | Lu | H04N 7/181 |
| | | | 348/148 |
| 2015/0116544 A1* | 4/2015 | Xu | H04N 5/2351 |
| | | | 348/234 |
| 2019/0187719 A1* | 6/2019 | El-Khatib | B60Q 1/346 |

* cited by examiner

VEHICLE ASSIST SYSTEM

TECHNICAL FIELD

The present invention relates generally to vehicle systems and, more specifically, relates to a vehicle assist system having camera assemblies that cooperate to mitigate changes in visibility.

BACKGROUND

Current driver assistance systems (ADAS—advanced driver assistance system) offer a series of monitoring functions in vehicles. In particular, the ADAS can monitor the environment around the vehicle and notify the driver of the vehicle of conditions therein. To this end, the ADAS can capture images of the surrounding environment and digitally process the images to extract information. The information is used to warn the driver of road obstacles located along the driving path. A common ADAS includes automatic emergency braking to help prevent rear-end collision and lane detection to help maintain the vehicle within the intended driving lane.

SUMMARY

In one aspect of the present invention, a method for assisting the operation of a host vehicle traveling on a roadway includes acquiring images around the host vehicle with at least one primary camera assembly having a first field of view. Visibility is detected within the first field of view. The at least one primary camera assembly is deactivated when the detected visibility is below a predetermined value. Images are acquired around the host vehicle with at least one secondary camera assembly having a second field of view until the detected visibility in the first field of view is at or above the predetermined value.

In another aspect, a vehicle assist system for a host vehicle traveling on a roadway includes at least one primary camera assembly for acquiring images around the host vehicle in a first field of view. At least one secondary camera assembly acquires images around the host vehicle in a second field of view. A sensor detects light within the first field of view. A controller is connected to the at least one primary camera assembly, the at least one secondary camera assembly, and the light sensor. The controller relies only on the at least one primary camera assembly to acquire images around the host vehicle when the detected light intensity within the first field of view is below a predetermined value. The controller relies only on the at least one secondary camera assembly to acquire images around the host vehicle when the detected light intensity in the first field of view is at or above the predetermined value.

Other objects and advantages and a fuller understanding of the invention will be had from the following detailed description and the accompanying drawings.

DETAILED DESCRIPTION

Figure 1:
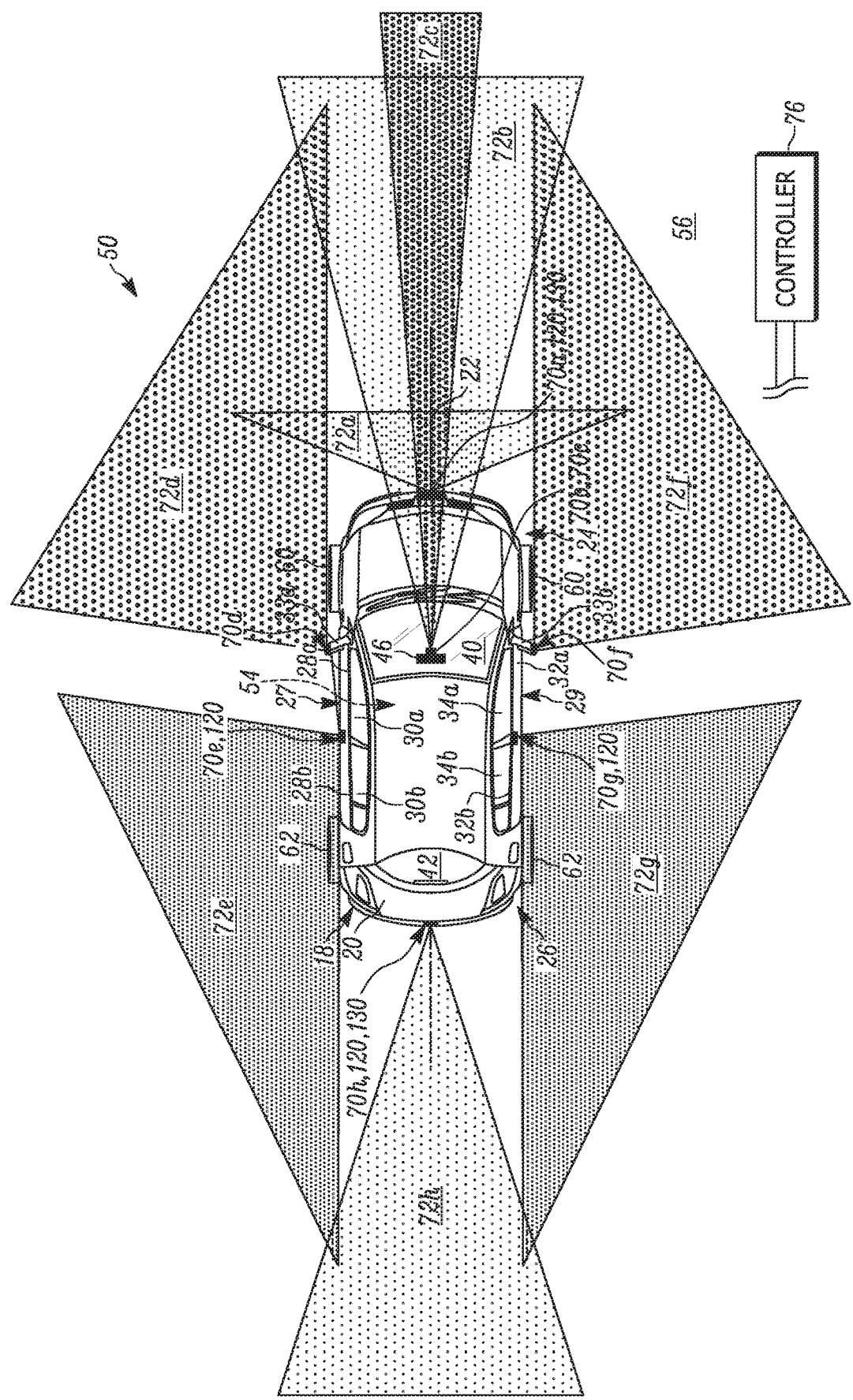
FIG. 1 is a top view of a host vehicle having an assist system in accordance with an embodiment of the present invention.

The present invention relates generally to vehicle systems and, more specifically, relates to a vehicle assist system having camera assemblies that cooperate to mitigate changes in visibility. FIG. 1 illustrates a host vehicle 20 having an assist system 50 in accordance with an embodiment of the present invention.

The host vehicle 20 extends along a centerline 22 from a front end 24 to a rear end 26. The host vehicle 20 includes a left side 27 and a right side 29 positioned on opposite sides of the centerline 22. The left side 27 includes a pair of doors 28a, 28b each having an associated window 30a, 30b. The right side 29 includes a pair of doors 32a, 32b each having an associated window 34a, 34b. A side view mirror 33a is connected to the door 28a. Another side view mirror 33b is connected to the door 32a.

The front end 24 of the host vehicle 20 includes a front window or windshield 40 extending generally between the left and right sides 27, 29. A rear view mirror 46 is secured to the windshield 40. The rear end 26 of the host vehicle 20 includes a rear window 42 extending generally between the left and right sides 27, 29. The windows 30a, 30b, 32a, 32b, 40, 42 and doors 28a, 28b, 32a, 32b collectively help define an interior 54 of the host vehicle 20. The exterior of the host vehicle 20 is indicated generally at 56.

The host vehicle 20 includes a pair of front steerable wheels 60 and a pair of rear wheels 62. The front wheels 60 are mechanically linked to a steering actuator or gear 68 (see FIG. 2), which is mechanically linked to a steering wheel 66. Alternatively, the front wheels 62 and steering wheel 66 could be part of a steer-by-wire system (not shown). The rear wheels 62 could also be coupled to the steering wheel 66 by the same steering gear 68 or another steering gear (not shown).

In any case, rotation of the steering wheel 66 actuates the steering gear 68 to turn the wheels 60 relative to the centerline 22 in order to steer the host vehicle 20. To this end, the steering wheel 66 has a neutral position in which the wheels 60 point in directions that are parallel to the centerline 22 such that the host vehicle moves in a straight line. Counterclockwise rotation of the steering wheel 66 angles the wheels 60 leftward relative to the centerline 22 (as shown in FIG. 1), causing the host vehicle 20 to turn left. Clockwise rotation of the steering wheel 66 angles the wheels 60 rightward relative to the centerline 22, causing the host vehicle 20 to turn right.

The assist system 50 includes camera assemblies 70a-70h provided around the periphery of the host vehicle 20. The camera assemblies 70a-70c are secured closer to the front end 24 of the host vehicle 20 along or adjacent to the centerline 22. As shown, the camera assembly 70a is secured to the front end bumper. The camera assemblies 70b, 70c are secured to the rear view mirror 46.

Camera assemblies 70d-70e are secured to the left side 27. Camera assemblies 70f-70g are secured to the right side 29. Alternatively, the camera assemblies 70d, 70e and 70f, 70g could be secured to the side view mirrors 33a, 33b, respectively (not shown). A camera assembly 70h is secured to the rear end 26 of the host vehicle 20 along or adjacent to the centerline 22. All the camera assemblies 70a-70h face outward away from the host vehicle 20. Accordingly, the camera assemblies 70a-70c are front- or forward-facing. The camera assembly 70h is back- or rearward-facing. The camera assemblies 70d-70g are side- or lateral-facing. It will be appreciated that more or fewer camera assemblies can be provided. In any case, all of the camera assemblies 70a-70h are electrically or wirelessly connected to a controller 74 in the host vehicle 20.

Each camera assembly 70a-70h has an associated field of view 72a-72h covering a portion of the host vehicle exterior 56. Collectively, the fields of view 72a-72h encircle the entire vehicle 20 and can overlap one another. The controller 74 continuously receives images taken by one or more of the camera assemblies 70a-70h within the respective fields of view 72a-72h. The controller 74 includes an image processing module (not shown) that receives and analyzes the data associated with the images from the camera assemblies 70a-70h. The controller 74 can, for example, stitch the images together to form a 360° surround view (not shown) of the host vehicle exterior 56. The images can also be relied on to identify objects around the host vehicle 20. In some instances, less than all of the cameras 70a-70h are used to detect objects or assist the operator.

Figure 2:
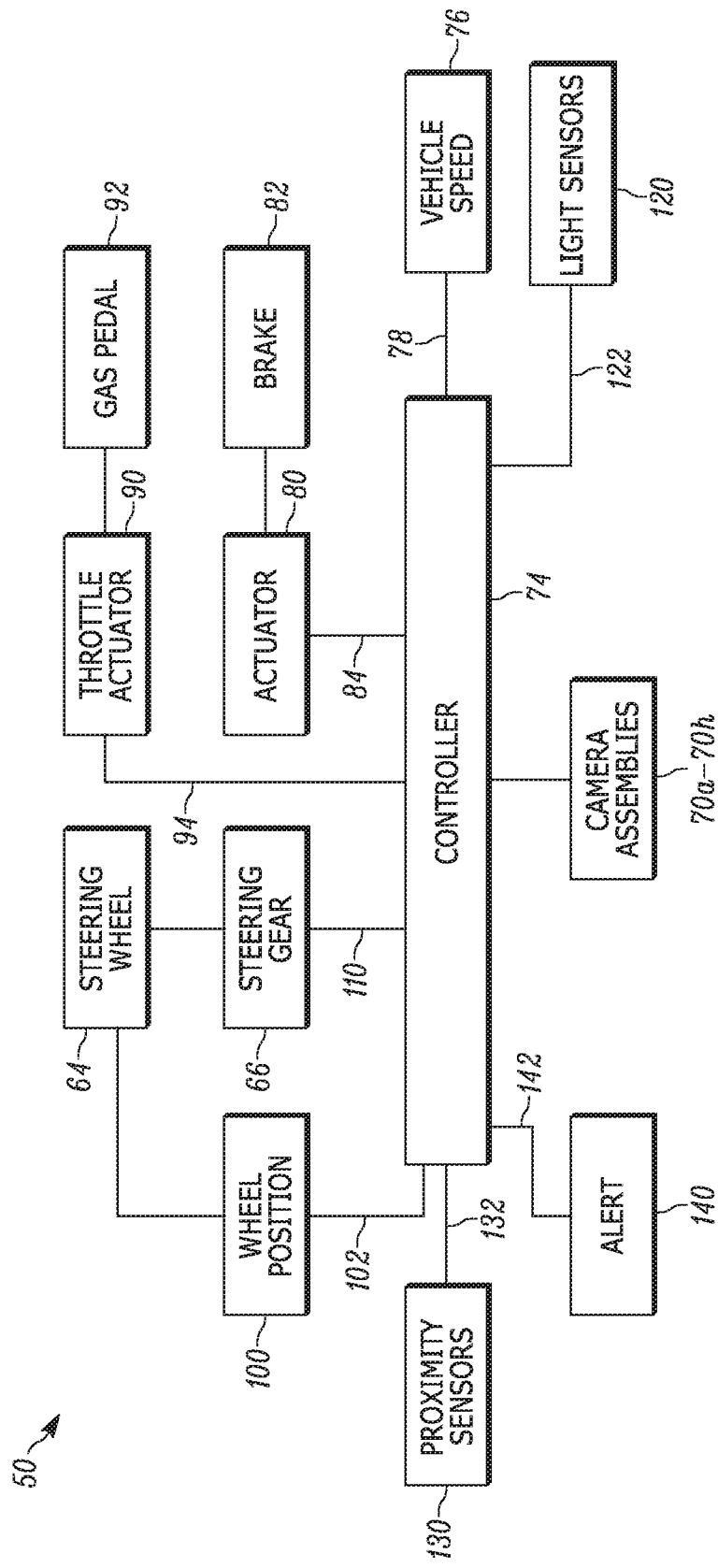
FIG. 2 is a schematic illustration of the assist system of FIG. 1.

Referring to FIG. 2, the controller 74 is also electrically or wirelessly connected to various sensors and actuators in the host vehicle 20 for monitoring and controlling several functions of the host vehicle, namely, vehicle speed and steering. To this end, the controller 74 is electrically or wirelessly connected to a vehicle speed sensor 76. The speed sensor 76 monitors the host vehicle speed and generates an electrical signal 78 indicative thereof that is sent to the controller 74 at predetermined time intervals.

The controller 74 is also electrically or wirelessly connected to an actuator 80 associated with the vehicle brake 82 and a throttle actuator 90 associated with the gas pedal 92. The controller 74 can send a control signal 84 to the brake actuator 80 to decrease the host vehicle 20 speed. The controller 74 can send a control signal 94 to the throttle actuator 90 to increase the host vehicle 20 speed.

A wheel position sensor 100 monitors the rotational angle of the steering wheel 64 and generates an electrical signal 102 indicative of the steering angle. The signal 102 is sent to the controller 74 at predetermined time intervals. The controller 74 can send a control signal 110 to the steering gear 66 in response to the wheel position signal 102, thereby controlling rotation of the steering wheel 64. The steering gear 66 actuation also controls the steering angle of the front wheels 60 relative to the centerline 22 of the host vehicle 20.

At least one light sensor 120 is provided on the host vehicle 20. One light sensor 120 is secured to the front end 24 [or the rear view mirror 46 (not shown)] and has a detection range substantially encompassing the fields of view 72a-72c of the camera assemblies 70a-70c. A light sensor 120 secured to the rear end 26 has a detection range that encompasses the field of view 72h of the camera assembly 70h. A light sensor 120 secured to the left side 27 has a detection range encompassing the fields of view 72d, 72e. A light sensor 120 secured to the right side 29 has a detection range encompassing the fields of view 72f, 72g. The light sensors 120 detect the presence and intensity of light in the fields of view 72a-72h of the camera assemblies 70a-70h. The light sensors 120 send signals 122 to the controller 74 indicative of light intensity within the fields of view 72a-72h.

At least one proximity sensor 130 can be electrically or wirelessly connected to the controller 74 for acquiring data related to objects around the vehicle exterior 56. The at least one proximity sensor 130 can include, for example, laser scanners, ultrasonic sensors, radar detectors, and LIDAR detectors, for determining and monitoring the distance between the host vehicle 20 and objects around the vehicle exterior 56 detected by the camera assemblies 70a-70h. In one example, proximity sensors 130 are provided on the front end 24 and rear end 26 of the host vehicle 20. The proximity sensors 130 can, however, be omitted entirely.

Based on this construction, the controller 74 is capable of receiving continuous feedback regarding the driving conditions of the host vehicle, e.g., vehicle speed and steering angle, images around the vehicle exterior 56 and the light intensities therein, and the distance between the host vehicle and objects identified in the images. The controller 74, in response to these inputs, is capable of controlling vehicle operation in a manner that helps increase occupant safety. To this end, the controller 74 can assist with or perform lane keep assistance, emergency braking, and backup assistance in response to images sent by the camera assemblies 70a-70h. The controller 74 is also capable of using different combinations of camera assemblies 70a-70h and/or selectively disabling one or more vehicle functions depending on the light intensity detected by the light sensors 120.

An alert 140 is electrically connected to the controller 74 for providing feedback to the operator of the host vehicle 20 before and/or while autonomous operations are performed by the assist system 50. The alert 140 provides visual, audio or haptic feedback to the operator when/while the controller 74 sends a signal 142 thereto.

Figure 3:
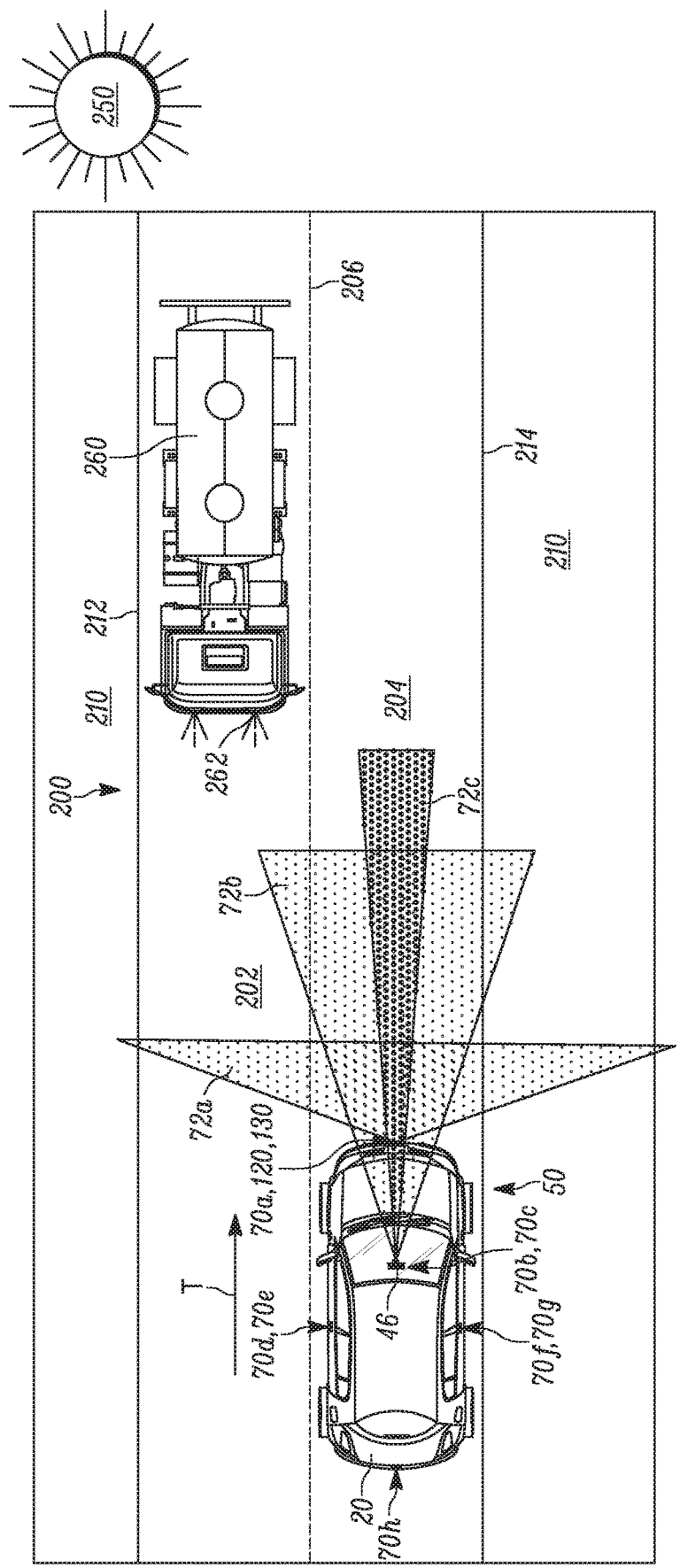
FIG. 3 is a schematic illustration of the host vehicle traveling on a roadway and sensing objects around the host vehicle with primary camera assemblies.

The assist system 50 utilizes different camera assemblies 70a-70h to detect objects around the vehicle exterior 56 on a roadway 200 depending on the intensity of the light detected by the sensors 120 within the fields of view 72a-72h. An example roadway 200 is shown in FIG. 3 and has a direction of vehicle travel illustrated by the arrow T. The roadway 200 includes a series of lanes 202, 204 separated by a dashed dividing line 206. Additional lanes and dividing lines are contemplated but not shown. The roadway 200 is separated from the surrounding off-road terrain 210 by a boundary line 212 on the left side (relative to the traveling direction T) and by a boundary line 214 on the right side.

In one example, as the host vehicle 20 travels in the direction T, the camera assemblies 72a-72c capture images of the lane line 206 and the boundary line 214 that are sent to the controller 74. The camera assemblies 72a-72c are therefore the primary or default camera assemblies while the host vehicle travels in the direction T. Alternatively, more or fewer of the camera assemblies 70a-70c could form the default camera assemblies. That said, the controller 74 relies on the proximity sensors 130 to monitor the distance between the host vehicle 20 and each line 206, 214.

The wheel position sensor 100 continuously supplies signals 102 to the controller 74. As a result, the controller 74 can analyze the images from the cameras 70a-70c and the signals 102 from the proximity sensors 100 and provide autonomous lane keep assistance. In particular, the controller 74 can actuate the steering gear 66 to prevent the host vehicle 20 from inadvertently drifting over the dividing line 206 into the lane 202. This can occur, for example, if the operator of the host vehicle 20 is distracted, tired, etc.

If, for example, the proximity sensor 130 detects that the host vehicle 20 is within a predetermined distance from the dividing line 206, the controller 74 actuates the steering gear 66 to rotate the steering wheel 64 clockwise from the neutral position. This pivots the wheels 60 and causes the host vehicle 20 to move laterally towards the boundary line 214. Once the proximity sensor 130 indicates that the host vehicle 20 is spaced a desired distance from both lines 206, 214 the controller 74 returns the steering wheel 64 to the neutral position such that the host vehicle 20 travels in a straight line in the lane 204 in the direction T.

Similarly, if the proximity sensor 130 detects that the host vehicle 20 is within a predetermined distance from the boundary line 214, the controller 74 actuates the steering gear 66 to rotate the steering wheel 64 counterclockwise from the neutral position. This pivots the wheels 60 and causes the host vehicle 20 to move laterally towards the dividing line 206. Once the proximity sensor 130 indicates that the host vehicle 20 is spaced a desired distance from both lines 206, 214 the controller 74 returns the steering wheel 64 to the neutral position such that the host vehicle 20 travels in a straight line in the lane 204 in the direction T. In both instances, the controller 74 sends a signal 142 to the alert 140 to provide feedback to the operator before and/or while the autonomous steering correction is made to maintain the host vehicle 20 between the lines 206, 214.

As the host vehicle 20 travels down the road 200, the camera assemblies 70a-70c are also used to detect objects in front of the host vehicle within the fields of view 72a-72c, e.g., other vehicles, animals, debris, etc. One example object is represented as the truck 260 in FIG. 3. The controller 74 relies on the proximity sensors 130 to monitor the distance between the host vehicle 20 and the object 260. If the controller 74 determines that the object 260 is within a predetermined distance, the controller initiates emergency braking by sending a control signal 84 to the brake actuator 80 to decrease the host vehicle 20 speed. The combination of the host vehicle 20 speed and the distance to the object can result in the controller 74 bringing the host vehicle to a complete stop. This can occur, for example, when the object 260 is in front of the host vehicle 20 and within the lane 204.

While the controller 74 acquires images, the light sensor 120 on the front end 24 of the host vehicle 20 continuously monitors the light intensity within the fields of view 72a-72c of the primary camera assemblies 70a-70c. This would include, for example, light directly from the sun 250; sunlight reflected off the roadway 200, other vehicles, buildings, etc.; and light from headlights 262 of oncoming vehicles 260. As long as the detected light intensity is below a predetermined value, the controller 74 relies on the primary camera assemblies 70a-70c to detect the lane lines 206, 214 and objects 260 around the host vehicle 20. The proximity sensors 130 are used in combination with the primary camera assemblies 70a-70c to allow the controller 74 to provide lane keep assistance and emergency braking, when desired.

Figure 4:
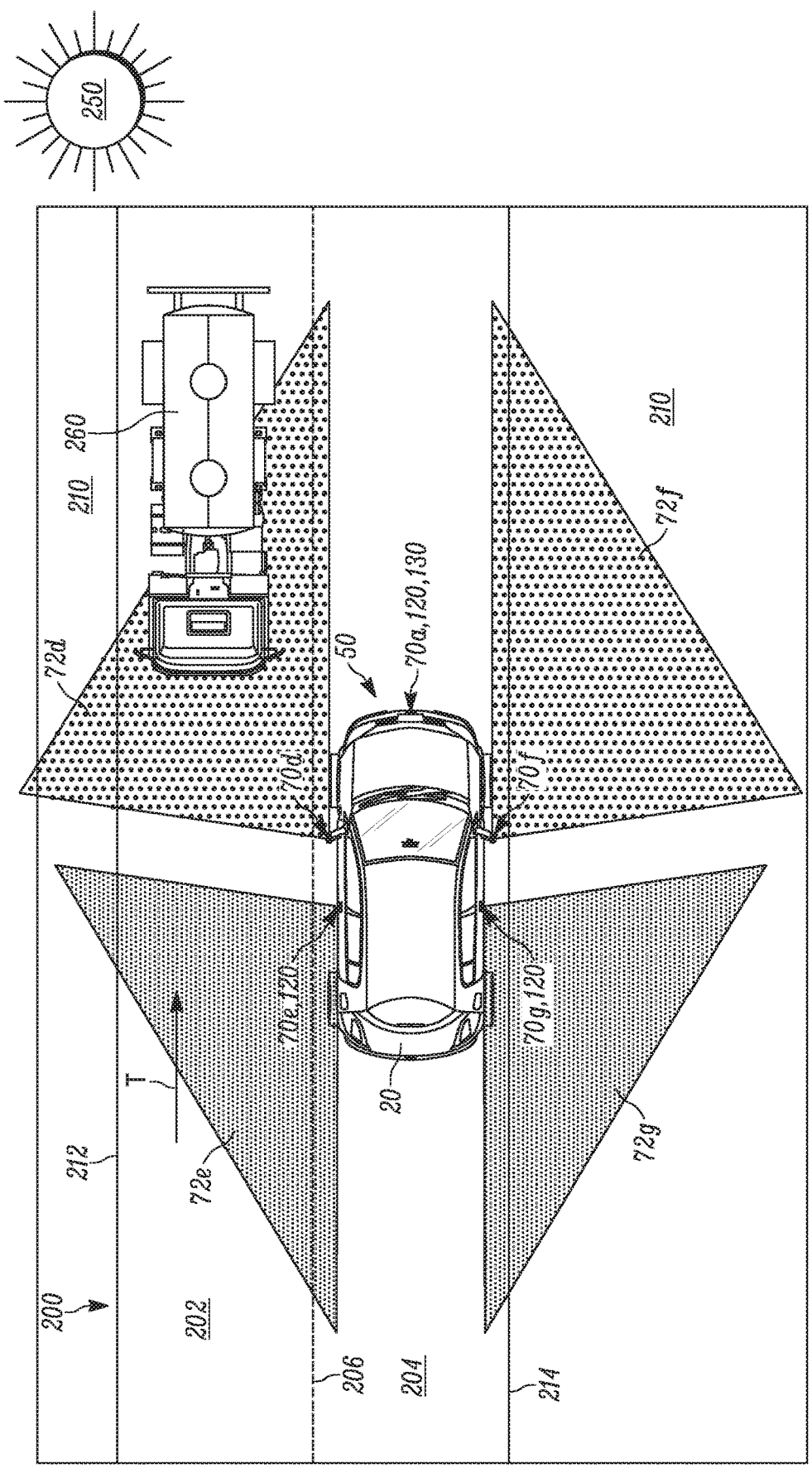
FIG. 4 is a schematic illustration of the host vehicle of FIG. 3 sensing objects around the host vehicle with secondary camera assemblies.

If, however, the detected light intensity exceeds the predetermined value, the controller 74 temporarily turns off or deactivates the primary camera assemblies 70a-70c. The controller 74 activates one or more of the camera assemblies 70d-70g to act as backup or secondary camera assemblies. The secondary camera assemblies 70d-70g are used to detect the lane lines 206, 214 and objects 260 around the host vehicle 20. This scenario is illustrated in FIG. 4. Although four secondary camera assemblies 70d-70g are used in FIG. 4 it will be appreciated that fewer secondary camera assemblies could alternatively be used, e.g., only the camera assemblies 70d, 70f closest to the front end 24 of the host vehicle 20.

The switch from primary to secondary camera assemblies is performed because the light intensity is at or above a level that blinds the primary camera assemblies 70a-70c. In other words, the light within the collective field of view 72a-72c is intense enough that one or more of the primary camera assemblies 70a-70c can no longer accurately or reliably detect the lane lines 206, 214 and/or objects 260 within the associated field(s) of view 72a-72c. The light intensity therefore affects the visibility of the primary camera assemblies 70a-70.

That said, the predetermined value for the detected light intensity corresponds with a predetermined value for the visibility of the primary camera assemblies 70a-70c. A light intensity above the predetermined value corresponds with a visibility below the corresponding predetermined value and vice versa. The determination to switch can be based on the light intensity/visibility with each individual field of view 72a-72c and/or the light intensity/visibility within the fields of view 72a-72c when examined as a collective whole.

Regardless of the determination method used, the controller 74 in either case is forced to instead rely on the secondary camera assemblies 70d-70g to conduct image gathering and determine when lane keep assistance and/or emergency braking is desired. The controller 74 selects only those camera assemblies to act as backups that are not also blinded by the incoming light. In other words, the controller 74 only uses those secondary camera assemblies 70d-70g having sufficient visibility due to the light intensity within the fields of view 72d-72f being below the predetermined value.

Once the light intensity within the collective field of view 72a-72c falls below the predetermined value, the controller 74 switches back to relying on the primary camera assemblies 70a-70c to detect the lines 206, 214 and monitor for objects 260 around the host vehicle. In other words, the controller 74 deactivates the secondary camera assemblies 70d-70g and reactivates the primary camera assemblies 70a-70c once the primary camera assemblies are no longer blinded by light such that sufficient visibility is restored. Consequently, the controller 74 returns to relying on the primary camera assemblies 70a-70c to determine when lane keep assistance and/or emergency braking is desired.

When the controller 74 determines that a backup/secondary camera assembly is needed, the controller can also decide whether or not to disable the lane keep assistance and/or emergency braking functions until the light intensity/visibility is no longer problematic. In particular, the controller 74 can unconditionally enable or disable each function.

The controller 74 can also place each function in a limp, conditional state in which it can only be performed when sufficient secondary camera assemblies 70d-70g are available for detecting the lane lines 206, 214 and objects 260. For example, the controller 74 can temporarily disable the lane keep assistance function so long as neither secondary camera assembly 70d, 70e is capable of detecting the dividing line 206 due to light blindness.

Disabled functions can be restored when the controller 74 returns to using primary camera assemblies 70a-70c having sufficient visibility. In any case, the controller 74 can send a signal 142 to the alert 140 providing feedback to the operator before and/or while the controller switches between primary and secondary camera assemblies or disables autonomous vehicle functions during travel in the direction T.

Figure 5:
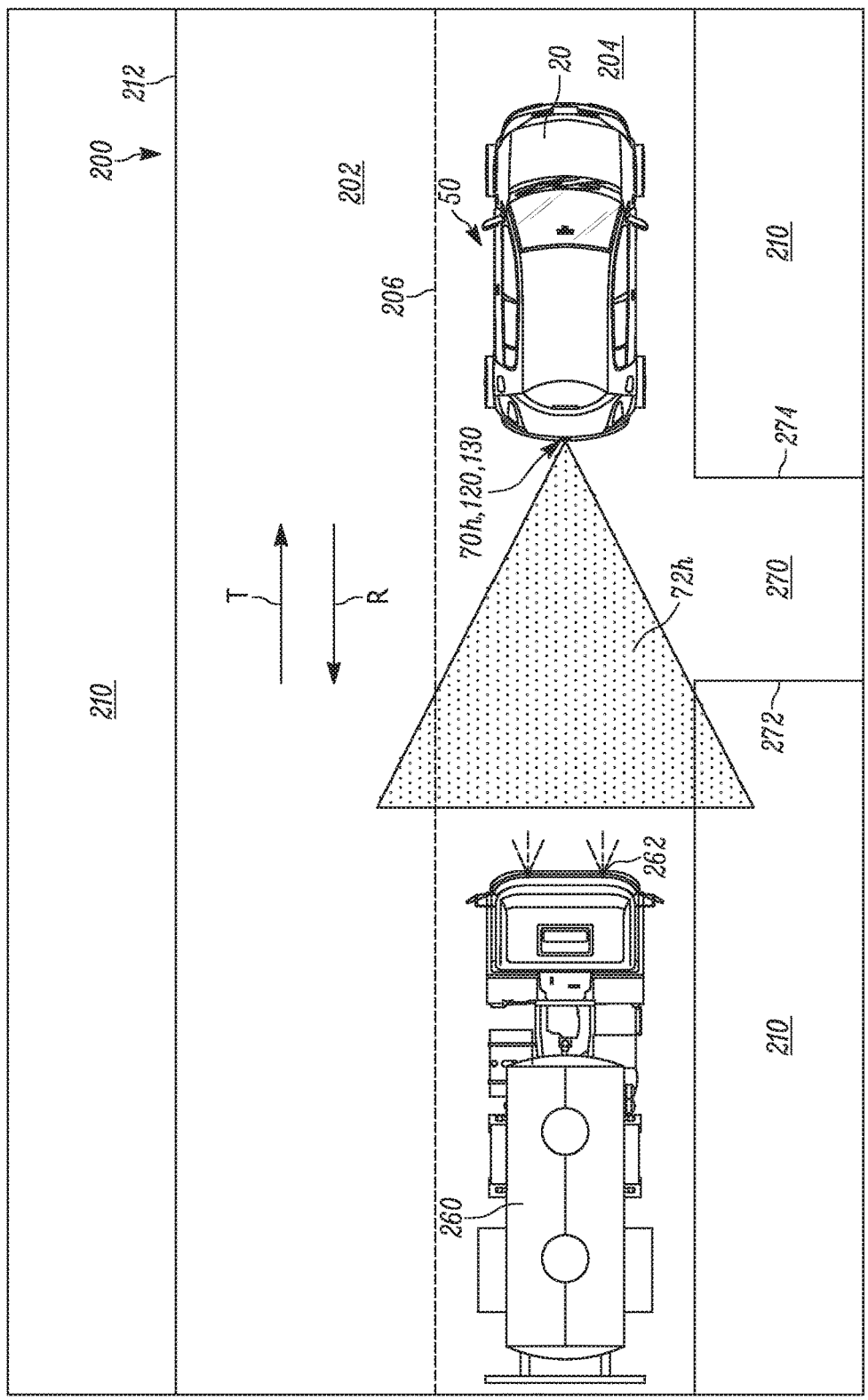
FIG. 5 is a schematic illustration of the host vehicle traveling backwards into a driveway and sensing objects behind the host vehicle with a primary camera assembly.

Referring to FIG. 5, the assist system 50 can also be used when the host vehicle 20 is backing up or reversing in the direction R opposite to the direction of travel T. Movement in the direction R can be desirable to, for example, back into a driveway 270 adjacent the road 200. When the host vehicle 20 is shifted into reverse, the controller 74 actuates the camera assembly 70h on the rear end 26. The camera assembly 70h captures images of the driveway 270, driveway boundary lines 272, 274, and objects 260 traveling or positioned behind the host vehicle 20. The camera assembly 70h therefore acts as the primary or default camera assembly while the host vehicle 20 backs up.

The operator can be presented with visual feedback of the images acquired by the primary camera assembly 70h on a display in the host vehicle interior 54 (not shown). This visual feedback helps the operator navigate the host vehicle 20 into the driveway 270 and between the boundary lines 272, 274 without driving onto the off-road terrain 210. The controller 74 can also provide backup assistance similar to the lane keep assistance described above. To this end, the controller 74 can help the operator by actuating the steering gear 66 in response to processing the images acquired by the primary camera assembly 70h.

More specifically, as the host vehicle 20 moves in the direction R, the proximity sensor 130 on the rear end 26 of the host vehicle detects the distance between the rear end and each boundary line 272, 274. The controller 74 can actuate the steering gear 66 to rotate the steering wheel 64 clockwise from the neutral position when the proximity sensor 130 determines the rear end 26 is within a predetermined distance from the boundary line 272. The controller 74 can actuate the steering gear 66 to rotate the steering wheel 64 counterclockwise from the neutral position when the proximity sensor 130 determines the rear end 26 is within a predetermined distance from the boundary line 274. One or both steering gear 66 actuations can occur multiple times before the host vehicle 20 is entirely within the driveway 270 between the boundary lines 272, 274.

While the host vehicle 20 moves in the direction R, the light sensor 120 on the rear end 26 continuously monitors the light intensity within the field of view 72h. The light can originate from the sun 250, headlights 262 from other vehicles 260 behind the host vehicle 20, etc. As long as the detected light intensity is below a predetermined value, the controller 74 relies on the primary camera assembly 70h to detect the driveway 270, driveway boundary lines 272, 274, and objects 260 around the host vehicle 20. The proximity sensors 130 are used in combination with the primary camera assembly 70h to allow the controller 74 to provide backup assistance, lane keep assistance, and/or emergency braking, when desired.

If, however, the detected light intensity exceeds the predetermined value, the controller 74 temporarily turns off or deactivates the primary camera assembly 70h and actuates one or more of the camera assemblies 70d-70g (see FIG. 6) to act as backup or secondary camera assemblies. The secondary camera assemblies 70d-70g detect the driveway 270, driveway boundary lines 272, 274, and objects 260 around the host vehicle 20. Although four camera assemblies 70d-70g are used in FIG. 6 it will be appreciated that fewer secondary camera assemblies could alternatively be used, e.g., only the camera assemblies 70e, 70g closest to the rear end 26 of the host vehicle 20.

The switch from primary to secondary camera assemblies is performed because the light intensity is at or above a level that blinds the primary camera assembly 70h, thereby reducing visibility below the predetermined value. In other words, the light within the field of view 72h is intense enough that the primary camera assembly 70h can no longer accurately or reliably detect the driveway 270, driveway boundary lines 272, 274, and/or objects 260 within the field of view 72h. As a result, the controller 74 instead relies on the secondary camera assemblies 70d-70g to conduct image gathering and determine when backup assistance, lane keep assistance, and/or emergency braking is desired. The controller 74 selects only those camera assemblies 70d-70g to act as backups that are not also blinded by the incoming light.

Once the light intensity within the field of view 72h is at or below the predetermined value, the controller 74 switches back to relying on the primary camera assembly 70h to detect the driveway 270, driveway boundary lines 272, 274, and objects 260 around the host vehicle 20. In other words, the controller 74 deactivates the secondary camera assemblies 70d-70g and reactivates the primary camera assembly 70h once the primary camera assembly has sufficient visibility. Consequently, the controller 74 returns to relying on the primary camera assembly 70h to determine when backup assistance, lane keep assistance, and/or emergency braking is desired.

Figure 6:
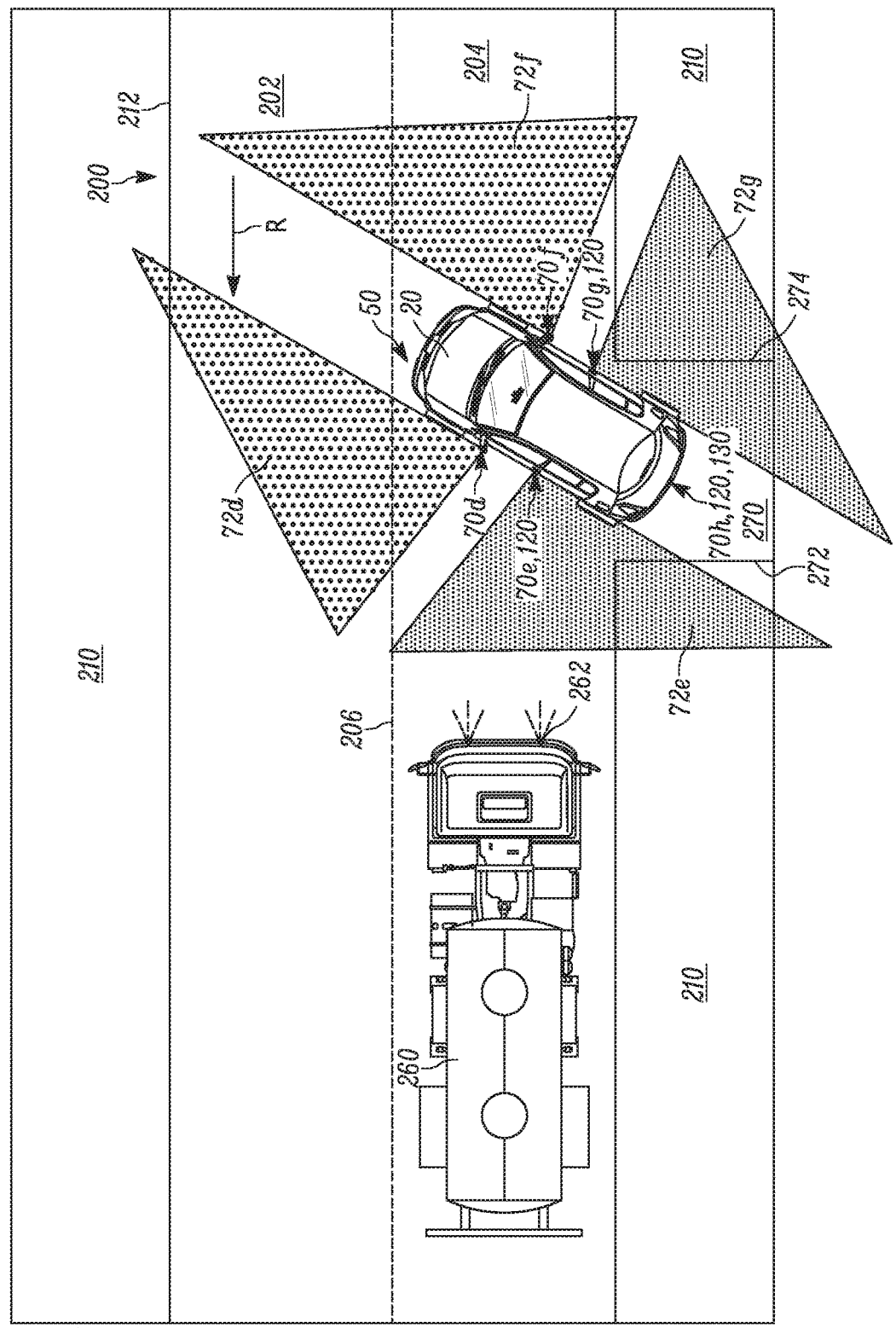
FIG. 6 is a schematic illustration of the host vehicle of FIG. 5 sensing objects behind the host vehicle with secondary camera assemblies
Figure 6:
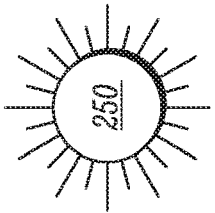

It will be appreciated that, similar to the conditions described in FIGS. 3-4, the controller 74 in FIGS. 5-6 can selectively disable the backup assistance, lane keep assistance, and/or emergency braking depending on the number of backup camera assemblies 70d-70g capable of providing sufficient images to the controller 74. For example, the controller 74 can temporarily disable the backup assistance function so long as neither secondary camera assembly 70e, 70g is capable of detecting the driveway boundary lines 272, 274. In any case, the controller 74 can send a signal 142 to the alert 140 providing feedback to the operator before and/or while the controller switches between primary and secondary camera assemblies or disables autonomous vehicle functions during travel in the direction R.

Although the assist system 50 of the present invention is described as helping a host vehicle 20 operator when one or more camera assemblies 70a-70h become blinded by too much light, it will be appreciated that other changes in the host vehicle environment can cause the controller 74 to switch from primary to secondary camera assemblies. For example, one or more of the fields of view 72a-72h can become partially or fully occluded due to dirt, rain, snow, etc., or the camera assembly can become damaged from rocks or other impact. In such cases, the controller 74 determines from the images received that the visibility within a particular field of view 72a-72h is below the predetermined value. In response, the controller 74 actuates one or more of the remaining camera assemblies to help maintain visibility around the host vehicle 20. The controller 74 can switch back to the primary camera assembly when visibility is restored, e.g., the primary camera assembly is wiped clean or repaired such that the visibility is at or above the predetermined value.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A method for assisting operation of a host vehicle traveling on a roadway, comprising:
   acquiring images around the host vehicle with at least one primary camera assembly having a first field of view;
   detecting visibility within the first field of view;
   deactivating the at least one primary camera assembly when the detected visibility is below a predetermined value; and
   switching to acquiring images around the host vehicle with at least one secondary camera assembly having a second field of view until the detected visibility in the first field of view is at or above the predetermined value, wherein the images within the second field of view are only acquired after determining the detected visibility is below the predetermined value.

2. The method of claim 1, wherein the at least one primary camera assembly comprises a forward-facing camera assembly and the at least one secondary camera assembly comprises a side-facing camera assembly.

3. The method of claim 1, wherein the at least one primary camera assembly comprises a rear-facing camera assembly and the at least one secondary camera assembly comprises a side-facing camera assembly.

4. The method of claim 3 further comprising:
   detecting boundary lines with the at least one secondary camera assembly; and
   autonomously providing backup assistance in response to the detected boundary lines.

5. The method of claim 1, wherein the step of detecting visibility comprises detecting light intensity within the first field of view without relying on the acquired images.

6. The method of claim 5, wherein the step of detecting light intensity comprises detecting sun light and headlights from another vehicle.

7. The method of claim 1 further comprising:
   detecting lane lines of the roadway with the at least one secondary camera assembly; and
   autonomously performing lane keep assistance in response to detecting the lane lines.

8. The method of claim 1 further comprising:
   detecting an object on the roadway with the at least one secondary camera assembly; and
   autonomously performing emergency braking in response to detecting the object.

9. The method of claim 1, wherein images are acquired by the at least one secondary camera assembly if a detected visibility within the second field of view is below the predetermined value.

10. The method of claim 9 further comprising disabling at least one autonomous vehicle assist function when the detected visibility within the second field of view is at or below the predetermined value.

11. The method of claim 10, wherein the at least one autonomous vehicle assist function comprises at least one of backup assistance, lane keep assistance, and emergency braking.

12. The method of claim 1, wherein the first field of view and the second field of view overlap one another.

13. A vehicle assist system for a host vehicle traveling on a roadway, comprising:
   at least one primary camera assembly for acquiring images around the host vehicle in a first field of view;
   at least one secondary camera assembly for acquiring images around the host vehicle in a second field of view;
   a sensor for detecting light within the first field of view;
   a controller connected to the at least one primary camera assembly, the at least one secondary camera assembly, and the light sensor, wherein the controller relies only on the at least one primary camera assembly to acquire images around the host vehicle when the detected light intensity within the first field of view is below a predetermined value, the controller relying only on the at least one secondary camera assembly to acquire images around the host vehicle when the detected light intensity in the first field of view is at or above the predetermined value, wherein the images within the second field of view are only acquired after determining the detected visibility is below the predetermined value.

14. The vehicle assist system of claim 13, wherein the at least one primary camera assembly comprises a forward-facing camera assembly and the at least one secondary camera assembly comprises a side-facing camera assembly.

15. The vehicle assist system of claim 13, wherein the at least one primary camera assembly comprises a rear-facing camera assembly and the at least one secondary camera assembly comprises a side-facing camera assembly.

16. The vehicle assist system of claim 13, wherein the light sensor detects at least one of sun light and headlights from another vehicle.

17. The vehicle assist system of claim 13, wherein images are acquired by the at least one secondary camera assembly if a detected light intensity within the second field of view is below the predetermined value.

18. The vehicle assist system of claim 17, wherein the controller disables at least one autonomous vehicle assist function when the detected light intensity within the second field of view is at or above the predetermined value.

19. The vehicle assist system of claim 18, wherein the at least one autonomous vehicle assist function comprises at least one of backup assistance, lane keep assistance, and emergency braking.

20. The vehicle assist system of claim 13, wherein the first field of view and the second field of view overlap one another.

* * * * *